(12) United States Patent
Sakai

(10) Patent No.: US 12,541,048 B2
(45) Date of Patent: Feb. 3, 2026

(54) OBSERVATION OPTICAL SYSTEM AND DISPLAY APPARATUS

(71) Applicant: CANON KABUSHIKI KAISHA, Tokyo (JP)

(72) Inventor: Yosuke Sakai, Tochigi (JP)

(73) Assignee: Canon Kabushiki Kaisha, Tokyo (JP)

( * ) Notice: Subject to any disclaimer, the term of this patent is extended or adjusted under 35 U.S.C. 154(b) by 374 days.

(21) Appl. No.: 18/174,427

(22) Filed: Feb. 24, 2023

(65) Prior Publication Data
US 2023/0280516 A1    Sep. 7, 2023

(30) Foreign Application Priority Data

Mar. 1, 2022 (JP) ................................ 2022-030701

(51) Int. Cl.
*G02B 5/30* (2006.01)
*G02B 27/01* (2006.01)
*G02B 27/09* (2006.01)

(52) U.S. Cl.
CPC ....... *G02B 5/3058* (2013.01); *G02B 27/0172* (2013.01); *G02B 27/0955* (2013.01)

(58) Field of Classification Search
CPC ........ G02B 5/305; G02B 5/30; G02B 5/3058; G02B 27/28; G02B 27/0172; G02B 27/0955
USPC .................................................... 359/385.01
See application file for complete search history.

(56) References Cited

U.S. PATENT DOCUMENTS

| 6,707,959 B2 * | 3/2004 | Ducellier ............. G02B 6/2931 385/24 |
| 8,165,470 B2 * | 4/2012 | Aota .................. G02B 6/29313 398/48 |
| 9,557,568 B1 * | 1/2017 | Ouderkirk .......... G02B 17/0856 |
| 2002/0180916 A1 * | 12/2002 | Schadt ................. G02B 5/3016 349/117 |
| 2005/0100277 A1 * | 5/2005 | Frisken .............. G02B 6/29311 385/37 |
| 2008/0158511 A1 * | 7/2008 | Takenaka ............... G03B 21/28 353/20 |

(Continued)

FOREIGN PATENT DOCUMENTS

| JP | 2015166861 A | 9/2015 |
| JP | 6501877 B2 | 4/2019 |
| WO | 2017039714 A1 | 3/2017 |

*Primary Examiner* — Daniel St. Cyr
(74) *Attorney, Agent, or Firm* — Canon U.S.A., Inc. IP Division

(57) ABSTRACT

An observation optical system is configured to guide light from a display device to an observation side. The observation optical system includes a lens having a first half-transmissive reflective surface, and a second half-transmissive reflective surface disposed closer to the display device than the first half-transmissive reflective surface. The light from the display device transmits through the second half-transmissive reflective surface, is reflected on the first half-transmissive reflective surface, is reflected on the second half-transmissive reflective surface, transmits through the first half-transmissive reflective surface, and is guided to the observation side. The first half-transmissive reflective surface has a metal wire microstructure and a polarization dependency. A pitch of the metal wire microstructure changes according to a height from an optical axis of the lens.

10 Claims, 6 Drawing Sheets

(56) References Cited

U.S. PATENT DOCUMENTS

2016/0309997 A1* 10/2016 Imamura ................ A61B 3/14

* cited by examiner

OBSERVATION OPTICAL SYSTEM AND DISPLAY APPARATUS

BACKGROUND

Technical Field

One of the aspects of the disclosure relates to an observation optical system suitable for an image display apparatus, such as a head mount display (TIMID), for magnifying and displaying an original image displayed on a display device (or element).

Description of the Related Art

As a compact observation optical system having a wide field angle, Japanese Patent No. 6501877 discloses an observation optical system that folds an optical path using a wire grid polarizer and a half-mirror. Japanese Patent Laid-Open No. 2015-166861 discloses a method of changing an incident angle characteristic of a transmittance relative to polarized light by changing a pitch of a metal wire structure of the wire grid polarizer, and a configuration for acquiring an optimum incident angle on the wire grid polarizer by controlling an arrangement angle of the wire grid polarizer.

The wire grid polarizer for the observation optical system disclosed in Japanese Patent No. 6501877 has the metal wire structure with a uniform period, and the incident angle characteristic of the transmittance relative to the polarized light passing through it is constant. In optical path folding using polarization, a ray on the optical axis (or on-axis ray) perpendicularly enters the wire grid polarizer whereas a ray at the periphery (or a peripheral ray) obliquely enters the wire grid polarizer. Therefore, in a case where the wire grid polarizer has a metal wire microstructure suitable for the perpendicular incidence, a transmitting polarized light amount may decrease at the periphery.

In an optical system that folds an optical path using the wire grid polarizer, light rays enter the wire grid polarizer at spatially different incident angles. Therefore, even if the arrangement angle of the wire grid polarizer is controlled as disclosed in the optical apparatus of Japanese Patent Laid-Open No. 2015-166861, it is difficult to maximize the transmittance relative to the polarized light for all light rays having spatially different incident angles.

SUMMARY

One of the aspects of the embodiment provides an observation optical system that folds an optical path using a metal wire microstructure and a display apparatus having the same, each of which can increase a transmittance relative to polarized light that transmits through the metal wire microstructure regardless of the incidence angle.

An observation optical system according to one aspect of the disclosure is configured to guide light from a display device to an observation side. The observation optical system includes a lens having a first half-transmissive reflective surface, and a second half-transmissive reflective surface disposed closer to the display device than the first half-transmissive reflective surface. The light from the display device transmits through the second half-transmissive reflective surface, is reflected on the first half-transmissive reflective surface, is reflected on the second half-transmissive reflective surface, transmits through the first half-transmissive reflective surface, and is guided to the observation side. The first half-transmissive reflective surface has a metal wire microstructure. The first half-transmissive reflective surface has a polarization dependency. A pitch of the metal wire microstructure changes according to a height from an optical axis of the lens. A display apparatus having the above observation optical system also constitutes another aspect of the disclosure.

Further features of the disclosure will become apparent from the following description of embodiments with reference to the attached drawings.

DESCRIPTION OF THE EMBODIMENTS

Referring now to the accompanying drawings, a description will be given of embodiments according to the disclosure.

Figure 1:
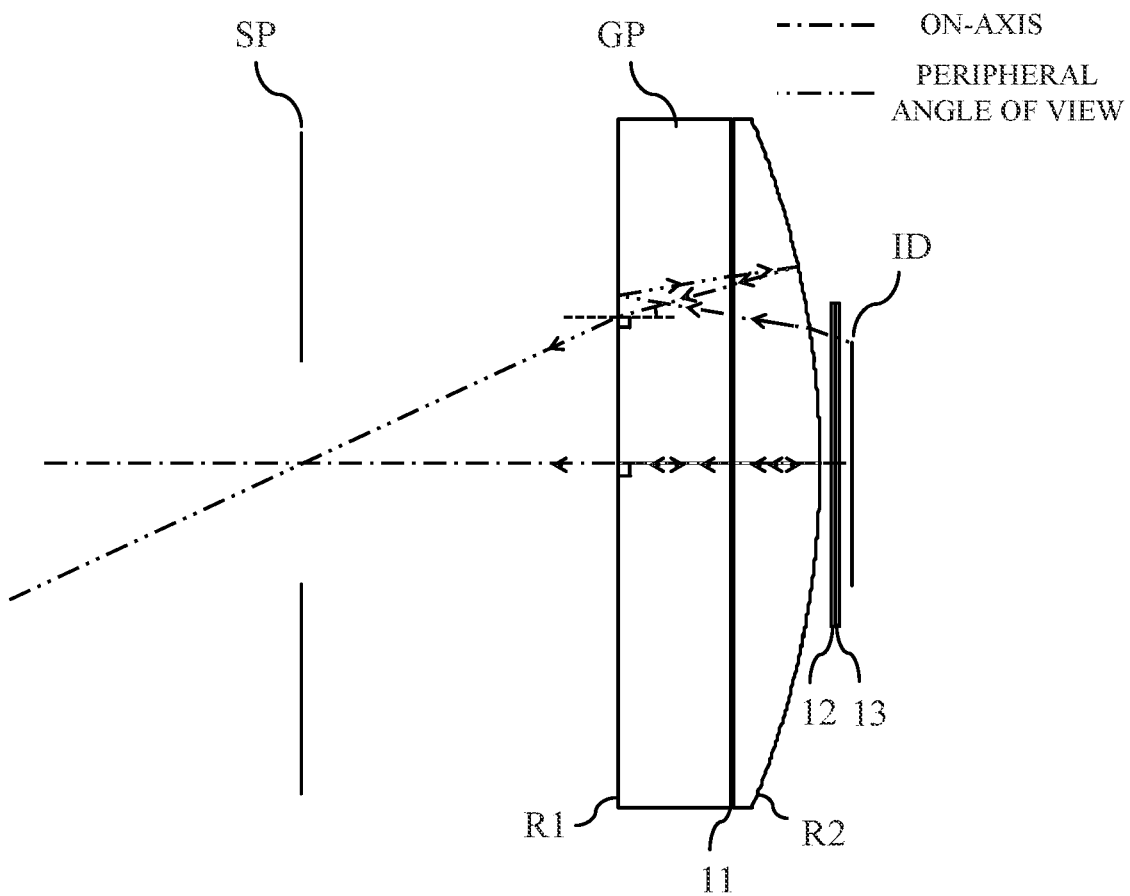
FIG. 1 illustrates an optical path of a principal ray on an optical axis and in a periphery of an observation optical system according to each example.

FIG. 1 illustrates a basic configuration of an observation optical system according to each example. The observation optical system is configured to fold an optical path, which will be described below, and to guide light from a display device to an observation side. The observation optical system includes, in order from the observation side to the display device side, a pupil plane SP, a resin lens GP having a first half-transmissive reflective surface R1, a first quarter waveplate 11, a second half-transmissive reflective surface R2, a second quarter waveplate 12, and a polarization plate 13. The pupil plane SP is an observation plane, on which a pupil of an observer is disposed. The first half-transmissive reflective surface R1 has a metal wire microstructure, and a polarization dependency. ID denotes a display surface (or display plane) of a display device, such as a liquid crystal display device (LCD), an organic EL element, or the like.

Part of the light that has been emitted from the display surface ID and has transmitted through the polarization plate 13 and the second quarter waveplate 12 transmits through the second half-transmissive reflective surface R2 and the first quarter waveplate 11, and travels toward the first half-transmissive reflective surface R1. Part of the light that has entered the first half-transmissive reflective surface R1 is reflected on the first half-transmissive reflective surface R1, transmits through the first quarter waveplate 11, and travels toward the second half-transmissive reflective surface R2. Part of the light that has entered the second half-transmissive reflective surface R2 is reflected on the second half-transmissive reflective surface R2, transmits through the first quarter waveplate 11, and again travels toward the first half-transmissive reflective surface R1. Part of the light that has again entered the first half-transmissive reflective surface R1 transmits through the first half-transmissive reflective surface R1 and reaches the pupil plane SP. Diverging light emitted from a point on the display surface ID is collimated while following the optical path as described above and guided to the pupil plane SP. Thus, the image displayed on the display surface ID is observed as a virtual image formed far away by an observer who has placed his pupil near the pupil plane SP.

The first half-transmissive reflective surface R1 has a polarization dependency that reflects linearly polarized light with a first polarization direction that is the same as that of linearly polarized light that has transmitted through the polarization plate 13, and transmits linearly polarized light in a second polarization direction orthogonal to the first polarization direction. A slow axis of the first quarter waveplate 11 and a slow axis of the second quarter waveplate 12 form an angle of 90° (or the slow axis of the first quarter waveplate 11 tilts by 90° to the slow axis of the second quarter waveplate 12). The slow axis of the first quarter waveplate 11 tilts by 45° to a polarization transmission axis of the polarization plate 13. The second half-transmissive reflective surface R2 is a half-mirror on which a dielectric multilayer film or the like is formed.

A description will be given of the usage of polarization in the observation optical system according to each example. The light emitted from the display surface ID is converted into linearly polarized light by the polarization plate 13, is converted into circularly polarized light by the second quarter waveplate 12, and travels toward the second half-transmissive reflective surface R2. Part of the circularly polarized light that has entered the second half-transmissive reflective surface R2 is reflected on the second half-transmissive reflective surface R2 and returns to the second quarter waveplate 12 as contra-rotating circularly polarized light. The contra-rotating circularly polarized light that has returned to the second quarter waveplate 12 is converted by the second quarter waveplate 12 into linearly polarized light with the second polarization direction orthogonal to the first polarization direction of the light that has transmitted through the polarization plate 13, returns to the polarization plate 13, and is absorbed by the polarization plate 13.

On the other hand, the circularly polarized light that has entered and transmitted through the second half-transmissive reflective surface R2 is converted by the first quarter waveplate 11 into linearly polarized light with a polarization direction that is the same as the first polarization direction of the light that has transmitted through the polarization plate 13, and enters the first half-transmissive reflective surface (having a polarization dependency) R1 of the resin lens GP. The linearly polarized light reflected here by the polarization dependency of the first half-transmissive reflective surface R1 is converted by the first quarter waveplate 11 into contra-rotating circularly polarized light with a polarization direction opposite to that of the light that has been converted into the circularly polarized light by the second quarter waveplate 12, and enters and is reflected on the second half-transmissive reflective surface R2. The circularly polarized light reflected on the second half-transmissive reflective surface R2 and having a rotating direction opposite to that before the reflection enters the first quarter waveplate 11, and becomes linearly polarized light with the second polarization direction orthogonal to the first polarization direction of the light that has transmitted through the polarization plate 13. This linearly polarized light enters and transmits through the first half-transmissive reflective surface R1, and is guided to the pupil plane SP.

Thus, only part of the light that has been emitted from the display surface ID, has transmitted through the polarization plate 13 and the second half-transmissive reflective surface R2, has been reflected on the first half-transmissive reflective surface R1 and the second half-transmissive reflective surface R2, and has transmitted through the first half-transmissive reflective surface R1 is guided to the pupil plane SP. The optical path is folded by the first half-transmissive reflective surface R1 and the second half-transmissive reflective surface R2. The following description will refer to the transmittance of the first half-transmissive reflective surface R1 relative to an effective ray (polarized light) guided from the display surface ID to the pupil plane SP as an effective polarization transmittance.

This embodiment changes the pitch of the metal wire microstructure of the first half-transmissive reflective surface R1 according to the height from the optical axis of the resin lens GP, in other words, the incident angle of the light (principal ray) that is reflected on the second half-transmissive reflective surface R2 and transmits through the first half-transmissive reflective surface R1. This configuration can optimize the spatial distribution of the metal wire microstructure according to the spatial distribution of the incident angle of the principal ray on the first half-transmissive reflective surface R1, and increase the effective polarization transmittance of the first half-transmissive reflective surface R1, that is, a light amount that transmits through the first half-transmissive reflective surface R1.

More specifically, as illustrated in FIG. 1, the principal ray on the optical axis (on-axis ray) traveling along the optical axis of the resin lens GP in the observation optical system perpendicularly enters the first half-transmissive reflective surface R1, whereas the principal ray at the periphery obliquely enters the first half-transmissive reflective surface R1. Therefore, the pitch of the metal wire microstructure is made different between a portion on and around the optical axis (on-axis portion) and a portion at the periphery (that is, according to the height from the optical axis). That is, the pitch of the metal wire microstructure in the on-axis portion is set according to the incident angle on the on-axis portion, and the pitch of the metal wire microstructure at the periphery is set according to the incident angle on the periphery. Thereby, the observation optical system can include the first half-transmissive reflective surface R1 having high effective polarization transmittances in the on-axis portion and at the periphery.

Figure 2:
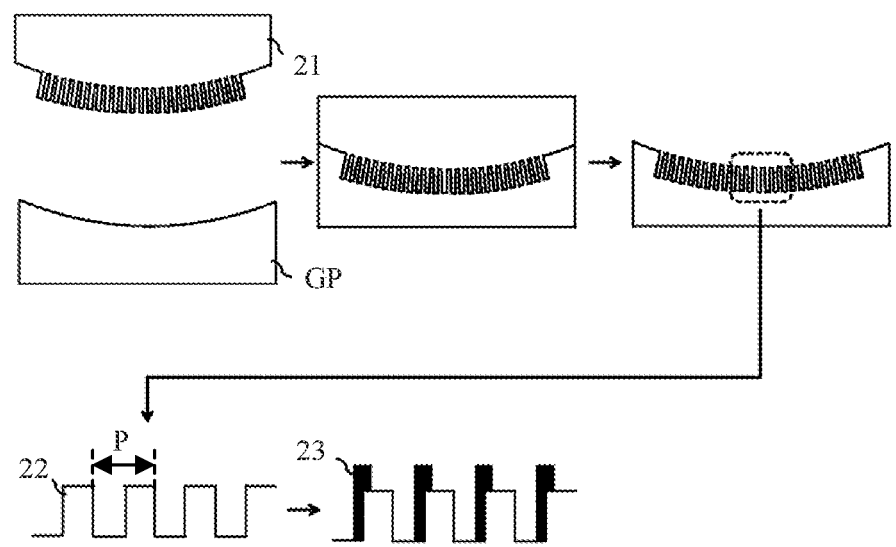
FIG. 2 illustrates a method for creating a metal wire microstructure according to each example.

FIG. 2 schematically illustrates a method of forming the metal wire microstructure. First, a plurality of grid-shaped convex portions 22 are transferred onto the surface of the resin lens GP by using a mold 21 having a concavo-convex microgrid. Next, the metal wire microstructure 23 having a microgrid shape is formed by obliquely laminating metal onto the plurality of convex portions 22 by vapor deposition. This metal wire microstructure 23 has the polarization dependency.

The pitch of the concavo-convex microgrid of the mold 21, a pitch P of the grid-shaped convex portions 22 transferred onto the resin lens GP, and the pitch of the metal wire microstructure 23 having the microgrid shape are approximately equal. Therefore, a desired pitch of the metal wire microstructure 23 can be easily obtained by setting the pitch of the concavo-convex microgrid of the mold 21.

An effective diameter (effective range) on the first half-transmissive reflective surface R1 is defined as a range through which the effective ray reaching the pupil plane SP from the display surface ID passes. In Examples 1 to 3, which will be described below, the pitch of the convex portions 22 of the resin lens GP (in other words, the pitch of the metal wire microstructure 23) within the effective diameter is made smaller or larger at the periphery than on and around the optical axis. Thereby, an obliquely incident ray on the periphery meets the primary or secondary band excitation condition for the surface plasmons of the metal wire microstructure, and the first half-transmissive reflective surface R1 has a high effective polarization transmittance at the periphery in the observation optical system.

In order for the metal wire microstructure 23 having the microgrid shape to acquire the polarization dependency, the pitch of the convex portions 22 of the resin lens GP may be 400 nm or less. By setting the shape of the mold 21 according to the surface shape of the resin lens GP for forming the convex portions 22, the polarization dependency can be given to the surface of the resin lens GP that can have a variety of shapes.

A description will now be given of inequalities (numerical conditions) that the observation optical system according to each example may satisfy.

The following inequality (1) may be satisfied in a case where the pitch of the metal wire microstructure 23 is smaller at the periphery than in the on-axis portion within the effective diameter of the first half-transmissive reflective surface R1. The pitch of the metal wire microstructure 23 can be considered equivalent to the pitch of the convex portions 22.

$$-0.6 \cdot \{\theta+(5/36)\pi\} \leq (P1-P0)/P0 < 0 \quad (1)$$

where P0 [nm] is a pitch in the on-axis portion (in a first grid range including the optical axis), P1 [nm] is a pitch at the periphery outside the first grid range (peripheral pitch), and θ [rad] is an incident angle on the first half-transmissive reflective surface R1 of a principal ray that transmits through the first half-transmissive reflective surface R1 and reaches the pupil plane SP (toward the observation side).

Inequality (1) relates to a relationship between the incident angle of the principal ray on the first half-transmissive reflective surface R1 (that is, the metal wire microstructure 23) and a reduction amount of the peripheral pitch P1 relative to the pitch P0 in the first grid range including the optical axis. $\theta+(5/36)\pi$ on the left side of inequality (1) represents an incident angle of an effective ray having an incident angle larger than that of the principal ray at the periphery.

In a case where inequality (1) is satisfied, the effective ray at the periphery satisfies the primary band excitation condition of the surface plasmons of the metal wire microstructure 23. By making the pitch P1 smaller than the pitch P0, the metal wire microstructure 23 can satisfy the primary band excitation condition of the surface plasmons for broadband light including shorter wavelengths.

Inequality (1) may be replaced with inequality (1a) below:

$$-0.55 \cdot \{\theta+(5/36)\pi\} \leq (P1-P0)/P0 < 0 \quad (1a)$$

Inequality (1) may be replaced with inequality (1b) below:

$$-0.55 \cdot \{\theta+(1/6)\pi\} < (P1-P0)/P0 < 0 \quad (1b)$$

On the other hand, the following inequality (2) may be satisfied in a case where the pitch of the metal wire microstructure 23 is larger at the periphery than in the on-axis portion within the effective diameter of the first half-transmissive reflective surface R1:

$$0 < (P1-P0)/P0 \leq 1.2 \cdot (\theta+(5/36)\pi) \quad (2)$$

Inequality (2) relates to a relationship between the incident angle of the effective ray on the first half-transmissive reflective surface R1 and an expansion amount of the peripheral pitch P1 relative to the pitch P0 in the first grid range. $\theta+(5/36)\pi$ on the right side of inequality (2) is the same as that on the left side of inequality (1).

In a case where inequality (2) is satisfied, the effective ray at the periphery satisfies the secondary band excitation condition of the surface plasmons of the metal wire microstructure 23. By making the pitch P1 larger than the pitch P0, the metal wire microstructure 23 can be easily manufactured.

Inequality (2) may be replaced with inequality (2a) below:

$$0 < (P1-P0)/P0 \leq 1.1 \cdot \{\theta+(5/36)\pi\} \quad (2a)$$

Inequality (2) may be replaced with inequality (2b) below:

$$0 < (P1-P0)/P0 \leq 1.1 \cdot \{\theta+(1/6)\pi\} \quad (2b)$$

Figure 3:
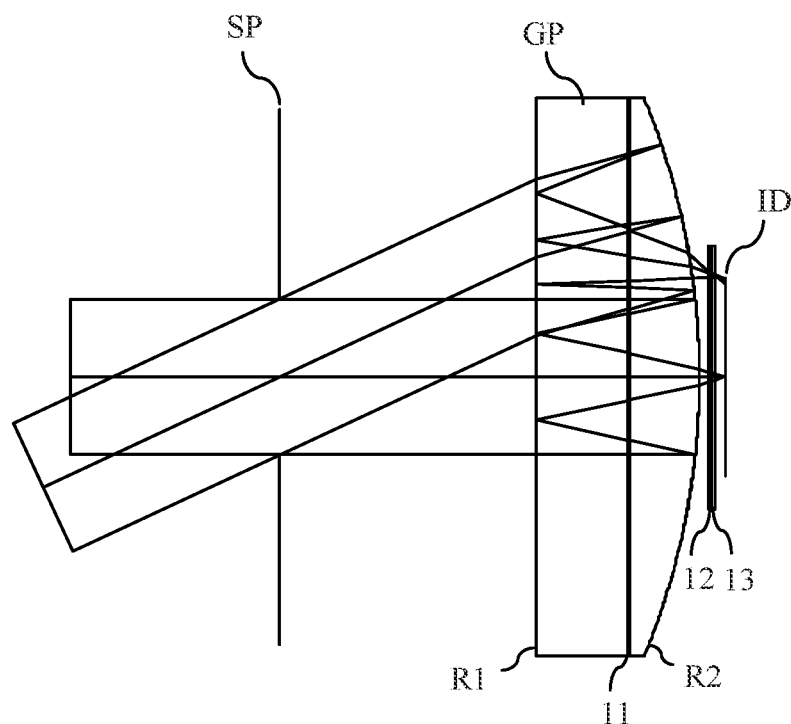
FIG. 3 is a sectional view of the observation optical system according to Example 1.
Figure 5:
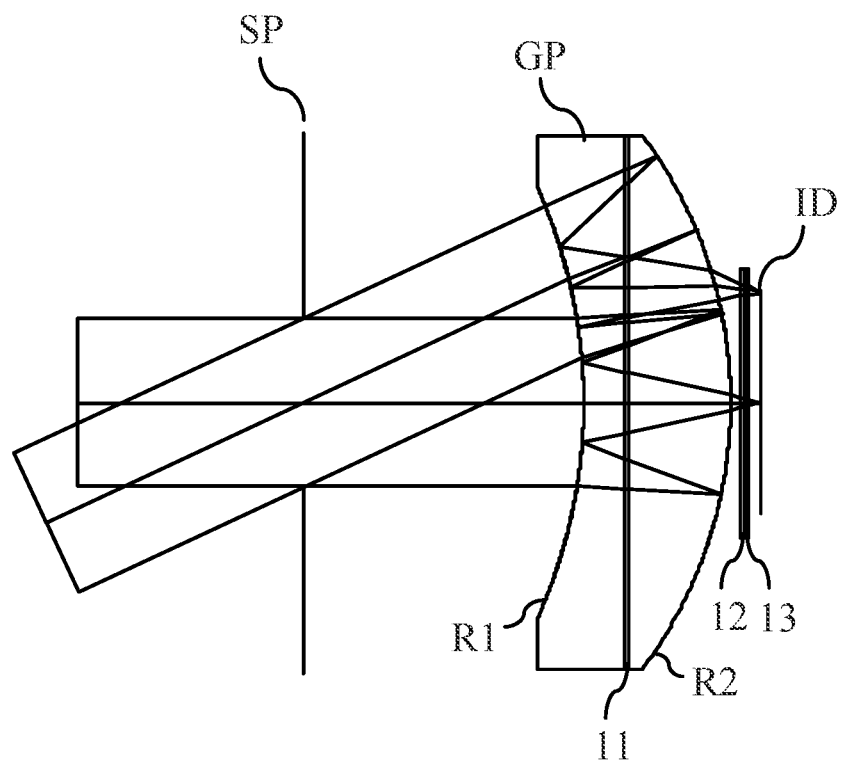
FIG. 5 is a sectional view of the observation optical system according to Example 2.
Figure 7:
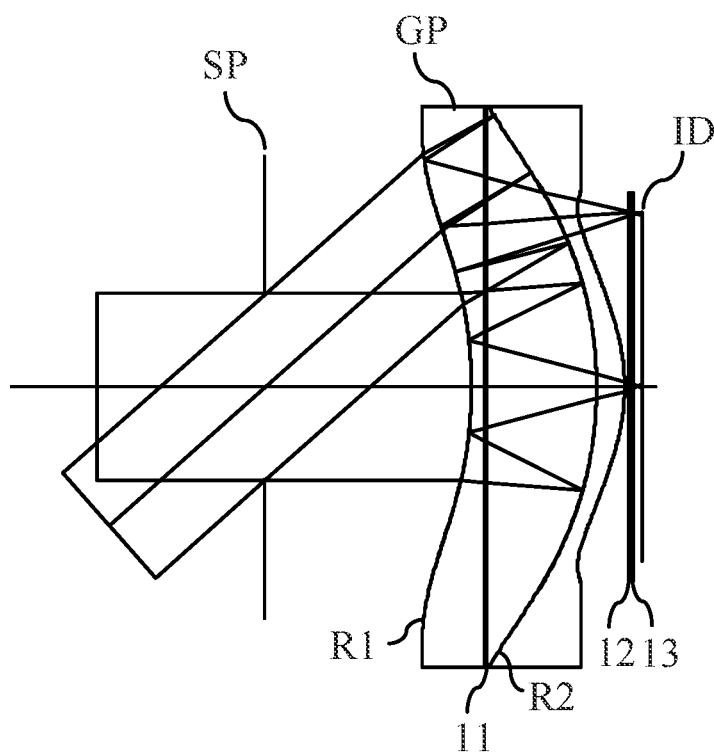
FIG. 7 is a sectional view of the observation optical system according to Example 3.

A specific description will now be given of Examples 1 to 3. FIGS. 3, 5, and 7 illustrate the configurations of the observation optical systems according to Examples 1, 2, and 3, respectively. Numerical examples 1, 2 and 3 corresponding to Examples 1, 2 and 3 respectively will follow the description of Example 3.

Figure 9:
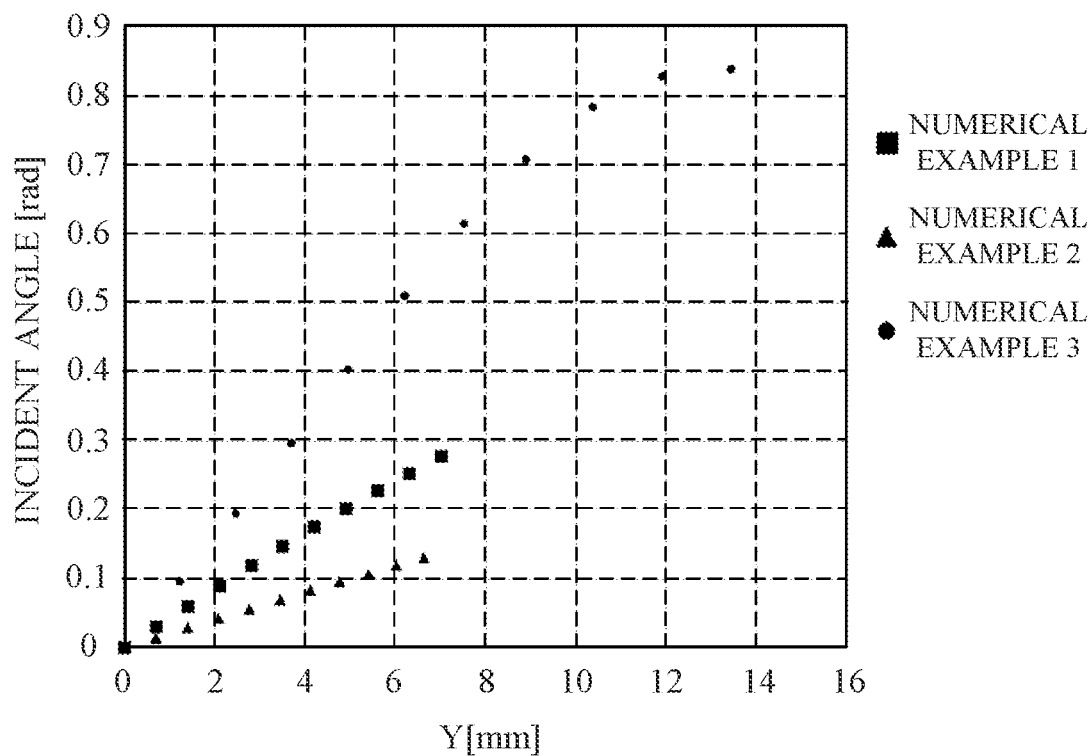
FIG. 9 illustrates a spatial distribution of an incident angle of a principal ray that passes through the metal wire microstructure in each example.

FIG. 9 illustrates a spatial distribution of an incident angle of an effective ray on the first half-transmissive reflective surface R1 according to each example. FIG. 9 illustrates an incident angle θ [rad] of the effective ray where Y [mm] is defined as a distance from the optical axis to the incident position of the effective ray on the first half-transmissive reflective surface R1. In each example, the on-axis ray perpendicularly enters (θ=0) the first half-transmissive reflective surface R1 (Y=0), and the incident angle of the principal ray increases as Y increases.

Figure 10:
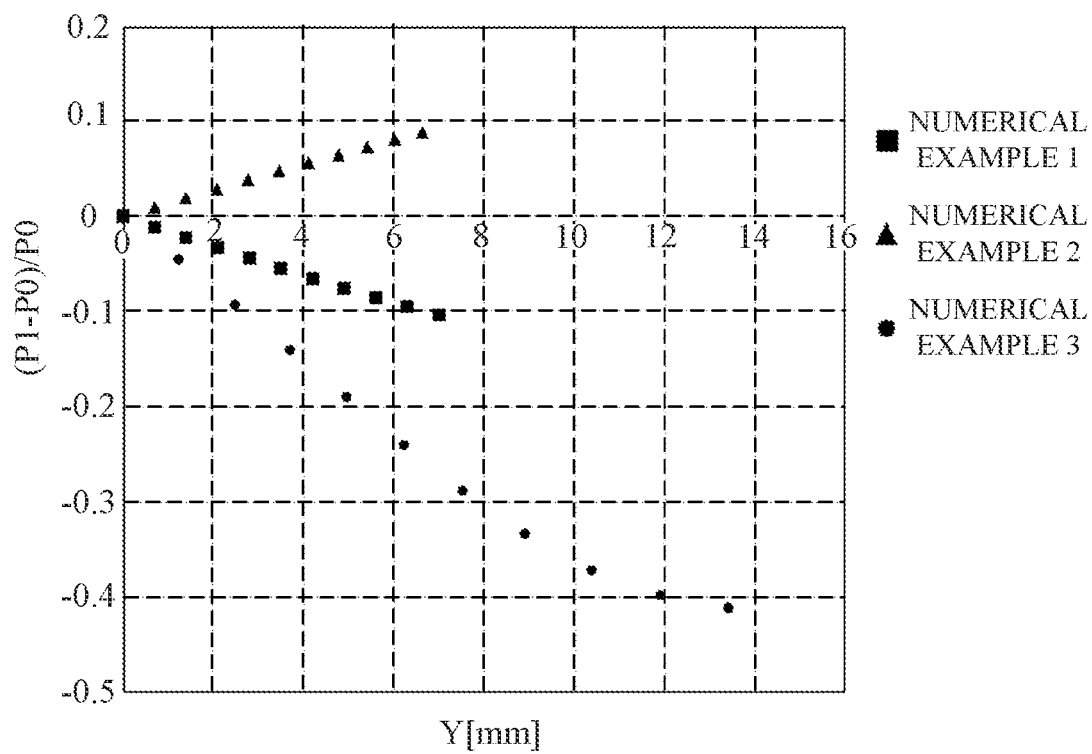
FIG. 10 illustrates a spatial distribution of the metal wire microstructure in each example.

FIG. 10 illustrates the spatial distribution of the metal wire microstructure according to each example. FIG. 10 illustrates (P1−P0)/P0 in inequalities (1) and (2) where Y [mm] is defined as the distance from the optical axis to the incident position of the effective ray on the first half-transmissive reflective surface R1.

The observation optical system according to Example 1 is an observation optical system that has a full angle of view of 50° (half angle of view of 25°) and a designed maximum pupil diameter of about (9 mm. The first half-transmissive reflective surface R1 having the metal wire microstructure and the polarization dependency is provided to a plane on the observation side of the resin lens GP.

As illustrated in FIG. 10, in Example 1, the pitch of the metal wire microstructure is smaller at the periphery than in the on-axis portion, and (P1−P0)/P0 in numerical example 1 satisfies the inequality (1).

The observation optical system according to Example 2 is also an observation optical system that has a full angle of view of 50° (half angle of view of 25°) and a designed maximum pupil diameter of about (9 mm. However, this example provides the first half-transmissive reflective surface R1 having the metal wire microstructure and the polarization dependency to the curved surface (concave surface) on the observation side of the resin lens GP. While it is difficult to attach a conventional sheet-shaped metal wire grid to the curved surface, this embodiment can provide the metal wire microstructure to the curved surface of the resin lens GP by the method illustrated in FIG. 2.

As illustrated in FIG. 10, in Example 2, the pitch of the metal wire microstructure is larger at the periphery than in the on-axis portion, and (P1−P0)/P0 in numerical example 2 satisfies inequality (2).

The observation optical system according to Example 3 is an observation optical system that has a full angle of view of 76° (half angle of view of 38°) and a designed maximum pupil diameter of about Φ14 mm. This embodiment provides the first half-transmissive reflective surface R1 having the metal wire microstructure and polarization dependency to an aspherical surface as a curved surface on the observation side of the resin lens GP. Using the method illustrated in FIG. 2 can improve the degree of freedom in the shape of the first half-transmissive reflective surface R1 and provide the observation optical system with a wider angle of view. This embodiment can use a display device larger than that of each of Examples 1 and 2. In a case where a larger display device is used, the incident angle θ on the first half-transmissive reflective surface R1 at the periphery becomes larger than that of each of Examples 1 and 2, as illustrated in FIG. 9. In the conventional metal wire grid having a uniform pitch, there is a concern that the effective polarization transmittance will decrease especially at the periphery where the incident angle θ is large. On the other hand, this embodiment can increase the effective polarization transmittance at the periphery where the incident angle θ is larger by making different the spatial distribution of the metal wire microstructure in the on-axis portion and that at the periphery.

As illustrated in FIG. 10, in Example 3, the pitch of the metal wire microstructure is smaller at the periphery than in the on-axis portion, and (P1−P0)/P0 in numerical example 3 satisfies inequality (1).

Figure 4:
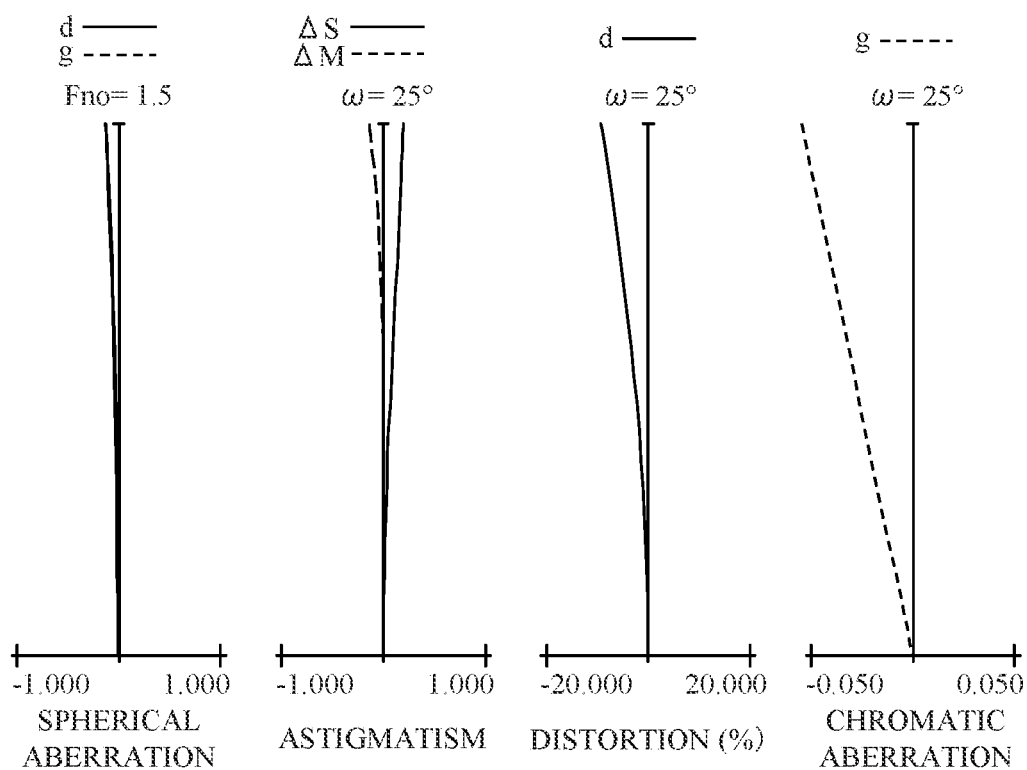
FIG. 4 is a longitudinal aberration diagram of the observation optical system according to Example 1.
Figure 6:
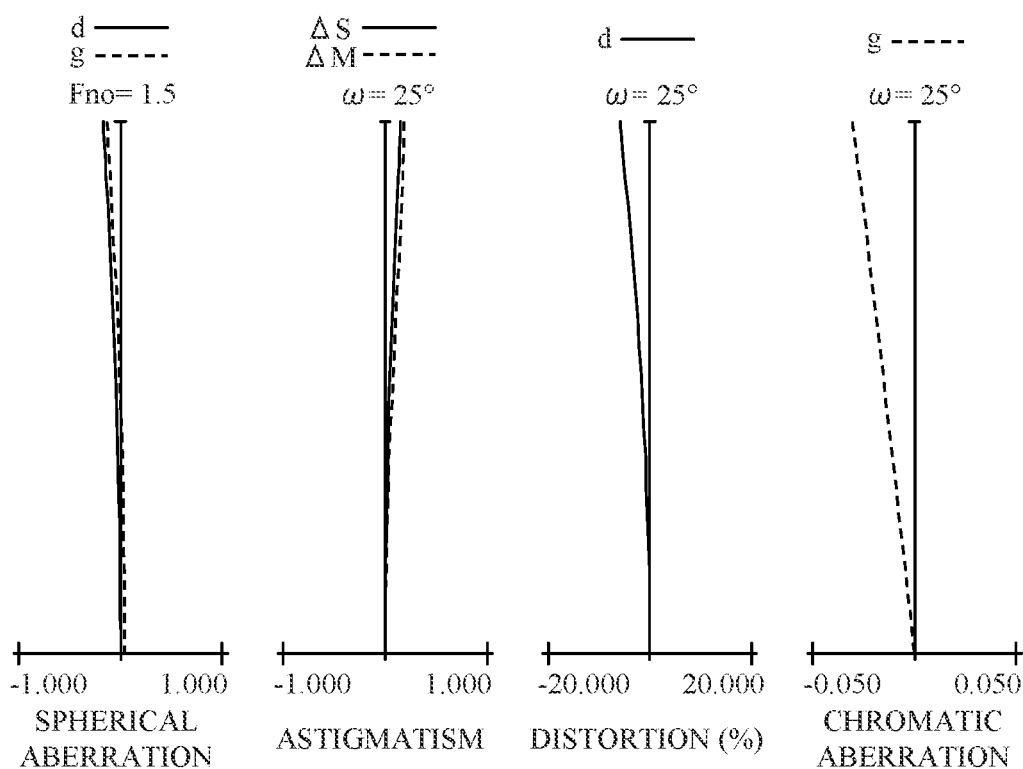
FIG. 6 is a longitudinal aberration diagram of the observation optical system according to Example 2.
Figure 8:
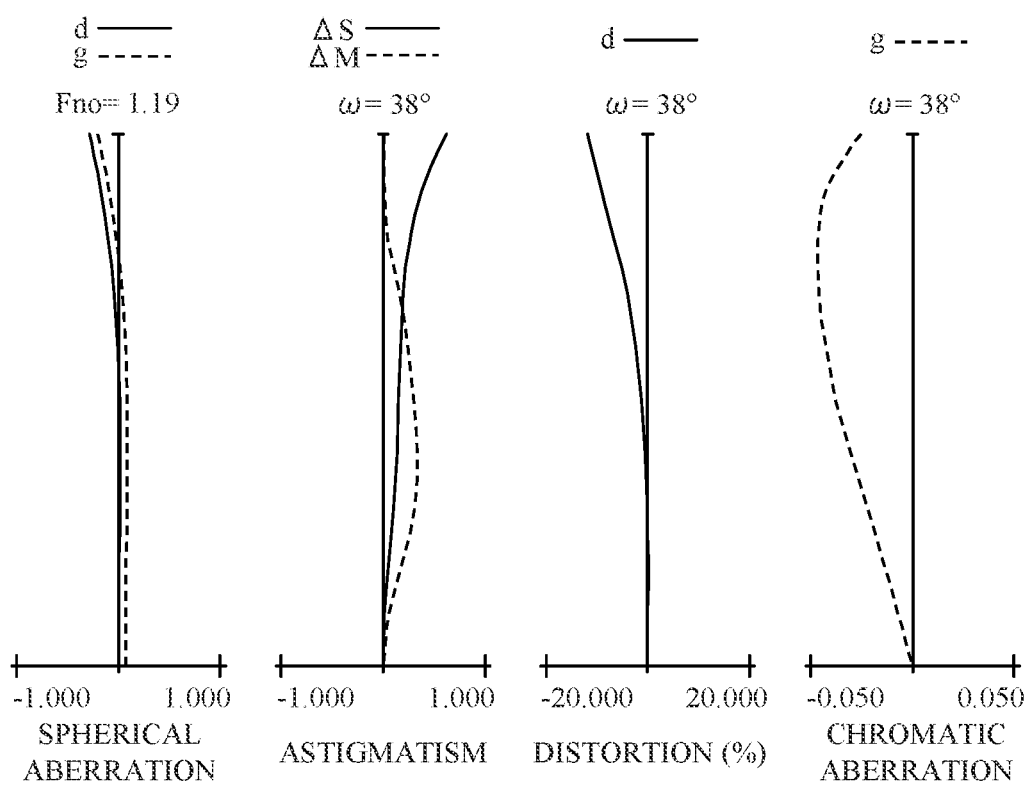
FIG. 8 is a longitudinal aberration diagram of the observation optical system according to Example 3.

FIGS. 4, 6, and 8 illustrate the longitudinal aberrations (spherical aberration, astigmatism, distortion, and chromatic aberration) of the observation optical systems according to numerical examples 1, 2, and 3, respectively. In each numerical example, an eye relief is 15 mm, which is a distance between a point on the optical axis on the pupil plane SP and the lens surface closest to the eye or the pupil plane SP (first half-transmissive reflective surface R1). In the spherical aberration diagram, Fno indicates the F-number, a solid line indicates a spherical aberration amount for the d-line (wavelength 587.6 nm), and a dashed line indicates a spherical aberration amount for the g-line (wavelength 435.8 nm). In the astigmatism diagram, a solid line ΔS indicates an astigmatism amount on a sagittal image plane, and a dashed line ΔM indicates an astigmatism amount on a meridional image plane. The distortion diagram illustrates a distortion amount for the d-line. The chromatic aberration diagram illustrates a lateral chromatic aberration amount for the g-line. ω is a half angle of view (°).

Since there is a one-to-one correspondence between the aberration of a ray reaching the pupil plane SP from a light emitting point on the display surface ID and the aberration of a ray reaching the display surface ID from a light emitting point on the pupil plane SP, each aberration diagram illustrates the aberration on the display surface ID. A person usually has a pupil diameter of about Φ4.0 mm, but the pupil plane SP in each example is disposed to be larger than Φ4.0 mm in consideration of the pupil position variation.

Numerical examples 1 to 3 will be illustrated below. In each numerical example, a surface number i indicates an order of a surface counted from the pupil plane SP. r denotes a radius of curvature of an i-th surface (mm), d is a lens thickness or air gap (mm) between i-th and (i+1)-th surfaces, and nd is a refractive index for the d-line of an optical element between the i-th and (i+1)-th surfaces. νd is an Abbe number based on the d-line of the optical element between the i-th and (i+1)-th surfaces. The Abbe number νd is expressed as follows:

$$\nu d = (Nd-1)/(NF-NC)$$

where Nd, NF, and NC are refractive indexes of the optical element based on the d-line (587.6 nm), F-line (486.1 nm), and C-line (656.3 nm) in the Fraunhofer line, respectively.

BF represents back focus (mm). The back focus is a distance on the optical axis from a surface closest to the display device of the observation optical system to the display surface ID in terms of air conversion length. An overall lens length is a length obtained by adding the back focus to a distance on the optical axis from the surface closest to the pupil plane SP to the final surface of the observation optical system.

An asterisk * attached to the surface number means that the surface has an aspherical shape. The aspherical shape is expressed as follows:

$$x = (h^2/R)/[1+\{1-(1+k)(h/R)^2\}^{1/2}] + A4 \times h^4 + A6 \times h^6 + A8 \times h^8 + A10 \times h^{10}$$

where x is a displacement amount from a surface vertex in the optical axis direction, h is a height from the optical axis in a direction orthogonal to the optical axis, R is a paraxial radius of curvature, k is a conical constant, A4, A6, A8, and A10 are aspherical coefficients. "e-x" in each aspherical coefficient means "×10$^{-x}$."

NUMERICAL EXAMPLE 1
UNIT: mm

Surface Data

| Surface No. | r | d | nd | νd |
|---|---|---|---|---|
| 1 (SP) | ∞ | 15.00 | | |
| 2 | ∞ | 5.32 | 1.54390 | 56.0 |
| 3 | ∞ | 0.20 | 1.58 | 50.0 |
| 4 | ∞ | 4.03 | 1.54390 | 56.0 |
| 5 | −42.812 | −4.03 | reflective surface | |
| 6 | ∞ | −0.20 | 1.58 | 50.0 |
| 7 | ∞ | −5.32 | 1.54390 | 56.0 |
| 8 | ∞ | 5.32 | reflective surface | |
| 9 | ∞ | 0.20 | | |
| 10 | ∞ | 4.03 | 1.54390 | 56.0 |
| 11 | −42.812 | 0.50 | | |
| 12 | ∞ | 0.20 | 1.58 | 50.0 |
| 13 | ∞ | 0.20 | 1.58 | 50.0 |
| 14 | ∞ | 0.65 | | |
| image plane | ∞ | | | |

| Focal Length | 13.62 |
|---|---|
| Fno | 1.50 |
| Half Angle of View(°) | 25.00 |
| Image Height | 6.35 |
| Overall Lens Length | 45.19 |
| BF | 0.65 |

NUMERICAL EXAMPLE 2
UNIT: mm

Surface Data

| Surface No. | r | d | nd | νd |
|---|---|---|---|---|
| 1 (SP) | ∞ | 15.00 | | |
| 2 | −28.565 | 2.25 | 1.54390 | 56.0 |
| 3 | ∞ | 0.20 | 1.58 | 50.0 |

-continued

NUMERICAL EXAMPLE 2
UNIT: mm

| | | | | |
|---|---|---|---|---|
| 4 | ∞ | 5.51 | 1.54390 | 56.0 |
| 5 | −24.063 | −5.51 | reflective surface | |
| 6 | ∞ | −0.20 | 1.58 | 50.0 |
| 7 | ∞ | −2.25 | 1.54390 | 56.0 |
| 8 | −28.565 | 2.25 | reflective surface | |
| 9 | ∞ | 0.20 | 1.58 | 50.0 |
| 10 | ∞ | 5.51 | 1.54390 | 56.0 |
| 11 | −24.063 | 0.50 | | |
| 12 | ∞ | 0.20 | 1.58 | 50.0 |
| 13 | ∞ | 0.20 | 1.58 | 50.0 |
| 14 | ∞ | 0.65 | | |
| image plane | ∞ | | | |

| | |
|---|---|
| Focal Length | 13.62 |
| Fno | 1.50 |
| Half Angle of View(°) | 25.00 |
| Image Height | 6.35 |
| Overall Lens Length | 40.45 |
| BF | 0.65 |

NUMERICAL EXAMPLE 3
UNIT: mm

Surface Data

| Surface No. | r | d | nd | vd |
|---|---|---|---|---|
| 1 (SP) | ∞ | 15.00 | | |
| 2* | −35.343 | 1.00 | 1.54390 | 56.0 |
| 3 | ∞ | 0.20 | 1.58 | 50.0 |
| 4 | ∞ | 7.93 | 1.54390 | 56.0 |
| 5* | −28.755 | −7.93 | | |
| 6 | ∞ | −0.20 | 1.58 | 50.0 |
| 7 | ∞ | −1.00 | 1.54390 | 56.0 |
| 8* | −35.343 | 1.00 | | |
| 9 | ∞ | 0.20 | 1.58 | 50.0 |
| 10 | ∞ | 7.93 | 1.54390 | 56.0 |
| 11* | −28.755 | 2.00 | 1.64240 | 22.5 |
| 12* | −14.875 | 0.28 | | |
| 13 | ∞ | 0.20 | 1.58 | 50.0 |
| 14 | ∞ | 0.20 | 1.58 | 50.0 |
| 15 | ∞ | 0.60 | | |
| image plane | ∞ | | | |

Aspheric Data

2nd Surface
K = 0.00000e+000 A 4 = −5.87948e−005 A 6 = 4.93835e−007
A 8 = −1.20470e−009 A10 = 1.12314e−012
5th Surface
K = 0.00000e+000 A 4 = −7.44051e−006 A 6 = 1.76963e−008
A 8 = 2.04028e−012 A10 = 5.33233e−014
8th Surface
K = 0.00000e+000 A 4 = −5.87948e−005 A 6 = 4.93835e−007
A 8 = −1.20470e−009 A10 = 1.12314e−012
11th Surface
K = 0.00000e+000 A 4 = −7.44051e−006 A 6 = 1.76963e−008
A 8 = 2.04028e−012 A10 = 5.33233e−014
12th Surface
K = 0.00000e+000 A 4 = 1.12173e−004 A 6 = 5.62249e−007
A 8 = −6.35442e−009 A10 = 2.58902e−011

| | |
|---|---|
| Focal Length | 16.26 |
| Fno | 1.19 |
| Half Angle of View(°) | 38.00 |
| Image Height | 12.70 |
| Overall Lens Length | 45.67 |
| BF | 0.60 |

Display Apparatus

Figure 11:
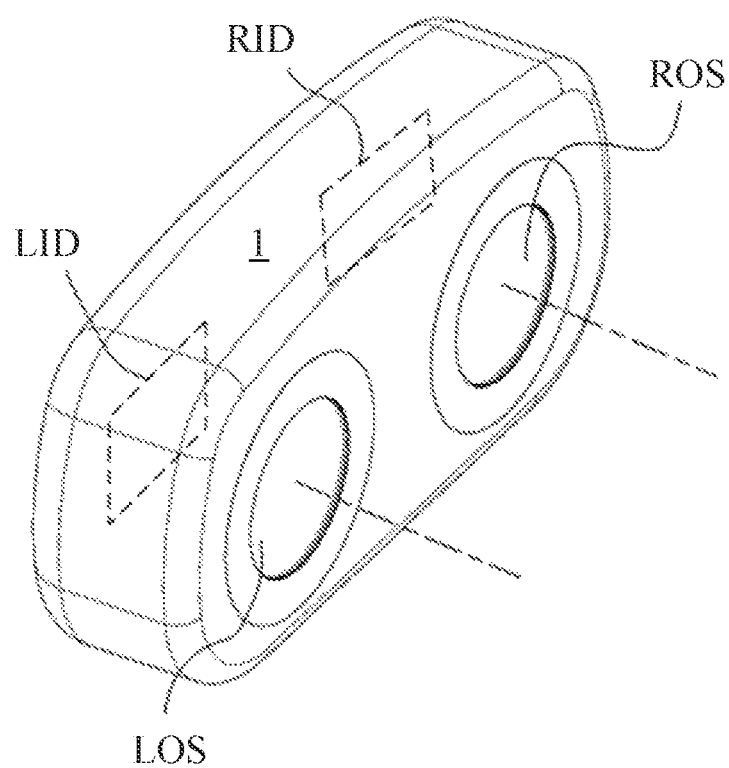
FIG. 11 illustrates an HMD using the observation optical system according to Examples 1 to 3.

FIG. 11 illustrates a head mount display (HMD) as an image display apparatus using the observation optical system according to any one of Examples 1 to 3. The HMD is mounted on the head of the observer (in front of the eyes) through an attachment gear. FIG. 11 illustrates ID for the right-eye observation as RID and ID for the left-eye observation as LID.

The HMD includes right-eye and left-eye image display devices RID and LID, a right-eye observation optical system ROS that guides display light from the right-eye image display device RID to the right eye of the observer, and a left-eye observation optical system LOS that guides display light from the left-eye display device LID to the left eye of the observer.

Using the observation optical systems illustrated in Examples 1 to 3 as the right-eye and left-eye observation optical systems ROS and LOS can provide the HMD that can observe bright images at all angles of view.

Each example can increase the transmittance of polarized light that transmits through the metal wire microstructure in the observation optical system that folds the optical path using the metal wire microstructure regardless of the incident angle.

While the disclosure has been described with reference to embodiments, it is to be understood that the disclosure is not limited to the disclosed embodiments. The scope of the following claims is to be accorded the broadest interpretation so as to encompass all such modifications and equivalent structure and functions.

This application claims the benefit of Japanese Patent Application No. 2022-030701, filed on Mar. 1, 2022, which is hereby incorporated by reference herein in its entirety.

What is claimed is:

1. An observation optical system configured to guide light from a display device to an observation side, the observation optical system comprising:
  a lens having a first half-transmissive reflective surface; and
  a second half-transmissive reflective surface disposed closer to the display device than the first half-transmissive reflective surface,
  wherein the light from the display device transmits through the second half-transmissive reflective surface, is reflected on the first half-transmissive reflective surface, is reflected on the second half-transmissive reflective surface, transmits through the first half-transmissive reflective surface, and is guided to the observation side,
  wherein the first half-transmissive reflective surface has a metal wire microstructure,
  wherein the first half-transmissive reflective surface has a polarization dependency, and
  wherein a pitch of the metal wire microstructure changes according to a height from an optical axis of the lens, and
  wherein the pitch is smaller at a periphery than in a first grid range including the optical axis in an effective range of the first half-transmissive reflective surface, and $$0.6 \times \{\theta + (5/36)\pi\} \leq (P1 - P0)/P0 < 0$$

where P0 is the pitch in a first grid range including the optical axis, P1 is the pitch at the periphery, and θ is an incident angle on the first half-transmissive reflective surface of a principal ray that transmits through the first half-transmissive reflective surface.

2. The observation optical system according to claim 1, wherein the pitch of the metal wire microstructure changes according to an incident angle on the first half-transmissive reflective surface of a principal ray reflected on the second half-transmissive reflective surface and transmitting through the first half-transmissive reflective surface.

3. The observation optical system according to claim 1, comprising, in order from the observation side:
the lens having the first half-transmissive reflective surface;
a first quarter waveplate;
the second half-transmissive reflective surface; and
a second quarter waveplate,
wherein the light from the display device is guided to the observation side via transmissions through the second quarter waveplate, the second half-transmissive reflective surface, and the first quarter waveplate, reflection on the first half-transmissive reflective surface, and transmission through the first quarter waveplate, reflection on the second half-transmissive reflective surface, and transmissions through the first quarter waveplate and the first half-transmissive reflective surface.

4. The observation optical system according to claim 3, wherein a slow axis of the first quarter waveplate and a slow axis of the second quarter waveplate form an angle of 90°.

5. The observation optical system comprising according to claim 4, further comprising a polarization plate provided on a side of the display device of the second quarter waveplate,
wherein the slow axis of the second quarter waveplate tilts by 45° to a polarization transmission axis of the polarization plate.

6. The observation optical system according to claim 1, wherein the lens is a resin lens, and
wherein the metal wire microstructure is formed by providing metal on a plurality of convex portions provided to the resin lens so that the pitch is different according to the height from the optical axis.

7. The observation optical system according to claim 1, wherein the pitch in a first grid range including the optical axis is 400 nm or less.

8. The observation optical system according to claim 1, wherein the observation optical system includes a positive lens and a negative lens.

9. A display apparatus comprising:
a display device; and
an observation optical system configured to guide light from the display device to an observation side,
wherein the observation optical system includes:
a lens having a first half-transmissive reflective surface; and
a second half-transmissive reflective surface disposed closer to the display device than the first half-transmissive reflective surface,
wherein the light from the display device transmits through the second half-transmissive reflective surface, is reflected on the first half-transmissive reflective surface, is reflected on the second half-transmissive reflective surface, transmits through the first half-transmissive reflective surface, and is guided to the observation side,
wherein the first half-transmissive reflective surface has a metal wire microstructure,
wherein the first half-transmissive reflective surface has a polarization dependency, and
wherein a pitch of the metal wire microstructure changes according to a height from an optical axis of the lens, and
wherein the pitch is smaller at a periphery than in a first grid range including the optical axis in an effective range of the first half-transmissive reflective surface, $$0.6 \times \{\theta + (5/36)\pi\} \leq (P1-P0)/P0 < 0$$

where P0 is the pitch in a first grid range including the optical axis, P1 is the pitch at the periphery, and θ is an incident angle on the first half-transmissive reflective surface of a principal ray that transmits through the first half-transmissive reflective surface.

10. An observation optical system configured to guide light from a display device to an observation side, the observation optical system comprising:
a lens having a first half-transmissive reflective surface; and
a second half-transmissive reflective surface disposed closer to the display device than the first half-transmissive reflective surface,
wherein the light from the display device transmits through the second half-transmissive reflective surface, is reflected on the first half-transmissive reflective surface, is reflected on the second half-transmissive reflective surface, transmits through the first half-transmissive reflective surface, and is guided to the observation side,
wherein the first half-transmissive reflective surface has a metal wire microstructure,
wherein the first half-transmissive reflective surface has a polarization dependency, and
wherein a pitch of the metal wire microstructure changes according to a height from an optical axis of the lens,
wherein the pitch is larger at a periphery than in a first grid range including the optical axis in an effective range of the first half-transmissive reflective surface, $$0 < (P1-P0)/P0 \leq 1.2 \times \{\theta + (5/36)\pi\}$$

where P0 is the pitch in the first grid range, P1 is the pitch at the periphery, and θ is an incident angle on the first half-transmissive reflective surface of a principal ray that transmits through the first half-transmissive reflective surface.

* * * * *